US009736306B2

(12) United States Patent
Pendyala et al.

(10) Patent No.: US 9,736,306 B2
(45) Date of Patent: Aug. 15, 2017

(54) SYSTEMS AND METHODS FOR PROVIDING PREDICTIVE PERSONALIZATION INTERACTIONS

(71) Applicant: Optum, Inc., Minnetonka, MN (US)

(72) Inventors: Mythili Pendyala, East Windsor, NJ (US); Ravindar Bommana, East Brunswick, NJ (US); Rajesh Ravindran Nair, Ambler, PA (US)

(73) Assignee: Optum, Inc., Minnetonka, MN (US)

( * ) Notice: Subject to any disclaimer, the term of this patent is extended or adjusted under 35 U.S.C. 154(b) by 102 days.

(21) Appl. No.: 14/988,271

(22) Filed: Jan. 5, 2016

(65) Prior Publication Data

US 2017/0195488 A1   Jul. 6, 2017

(51) Int. Cl.
| | |
|---|---|
| H04M 3/00 | (2006.01) |
| H04M 5/00 | (2006.01) |
| H04M 3/51 | (2006.01) |
| H04M 3/493 | (2006.01) |

(52) U.S. Cl.
CPC .......... *H04M 3/5183* (2013.01); *H04M 3/493* (2013.01); *H04M 3/51* (2013.01)

(58) Field of Classification Search
CPC ....... H04M 3/5183; H04M 3/51; H04M 3/493
See application file for complete search history.

(56) References Cited

U.S. PATENT DOCUMENTS

| | | | | |
|---|---|---|---|---|
| 7,467,135 | B2* | 12/2008 | Coker | G06Q 30/02 |
| 8,363,796 | B2* | 1/2013 | Adkar | H04M 3/493 |
| | | | | 379/202.01 |
| 9,307,084 | B1* | 4/2016 | Pycko | H04M 3/5166 |
| 2003/0206621 | A1* | 11/2003 | Pennington, Jr. | G06Q 30/02 |
| | | | | 379/265.01 |

* cited by examiner

*Primary Examiner* — Nafiz E Hoque
(74) *Attorney, Agent, or Firm* — Seyfarth Shaw LLP; Brian Michaels

(57) ABSTRACT

An improved communication channel system, such as an improved interactive voice response (IVR) system, and methods that route calls to an appropriate customer agent terminal and correspondingly delivers selected data and selected treatments to be presented to a customer of an organization are described. An improved customer relationship management (CRM) system is in communication with the improved IVR system. Data stores associated with the improved CRM and/or IVR systems are specially configured to allow for datatables therein to be continuously reworked and updated to create and include new treatments specifically tailored on an individual customer level. The improved system includes a rules engine including logic specific to the suppression of treatments. Relevant, unsuppressed treatment information, including scripts and related data, is sent to the computing device of an organization agent, and the data is presented as a script in a GUI of the computing device.

18 Claims, 15 Drawing Sheets

SYSTEMS AND METHODS FOR PROVIDING PREDICTIVE PERSONALIZATION INTERACTIONS

FIELD OF TECHNOLOGY

The present disclosure relates generally to communication networks, and more particularly to routing connections and information within a network.

BACKGROUND

Individuals contact organizations on a daily basis for a variety of reasons. In the past, organization representatives received and routed calls based on verbal caller input. Organizations routinely have networks with automated systems that receive and route calls within the network. The automated systems sometimes use natural language or intelligent routing technologies that route incoming calls using data and/or voice input of a caller, according to a fixed protocol.

An organization's representative is typically at a computer terminal or workstation but is limited in the interactions in which they can engage (e.g. topics upon which they can speak to an individual or "scripts") and information they have at their disposal with which to interact. Often times, a representative can only speak to an individual using limited/defined scripts that appear on their graphical user interface (GUI) at the agent's terminal. Sometimes, a script may relate to a program of the organization that the organization wants to promote. However, these promoted program scripts are often presented to the representative, and subsequently the individual, irrespective of the needs of the customer. Thus, an individual that contacts the organization may be routed to an agent and receive information for a program that they do not care about, that they are already a member of, or that is irrelevant to the customer. Present communication channel systems, such as web interfaces, are also deficient because they fail to keep user interfacing and treatment data dynamically up-to-date to address contemporary individualized needs.

As discussed above, present systems typically involve one communication channel (i.e., the individual contacts the organization telephonically). However, it may be desirable to enable an individual to contact the organization using other communication channels, such as via the Internet. Known communication systems that utilize multiple communication channels typically provide the contacting individual with a different experience for each communication channel used, and require different platforms for actions and interactions by or with agents.

SUMMARY

The present disclosure generally provides an improved communication channel system, such as an improved Interactive Voice Response (IVR) system, and methods that route calls to an appropriate customer agent terminal and correspondingly delivers selected data and selected treatments to be presented to a customer of an organization. "Treatments" or "treatment options," as used herein, refer to tailored interactions including scripts that an organization representative/agent may use when interacting with a customer. The teachings of the present disclosure solve technical problems associated with inappropriate call routing and/or problems associated with inapplicable scripts/treatments as well as limited data availability and the rigidity of data stores in interfacing over communications channels.

The present disclosure provides an improved customer relationship management (CRM) system in communication with an improved interactive voice response (IVR) system. The improved IVR system receives a customer communication and routes the customer to a competent organization agent. Data stores associated with the improved CRM and/or IVR system of the present disclosure are specially configured to allow for datatables therein to be continuously reworked and updated to create and include new treatments specifically tailored on an individual customer level to be routed with the customer call to the appropriate agent workstation. The improved CRM and/or IVR system is configured to communicate with internal and external sources to determine treatments for presentment to the customer. For example, the customer's age, geographic location, and demographic information may be used to determine the customer's eligibility for one or more treatments.

The improved system comprises an architecture that includes an automated treatment processor including logic specific to the suppression of treatments as a function of applied logic or rules. For example, suppression logic may be implemented whereby even though a customer is eligible to receive a treatment, the treatment may be suppressed from being presented to the customer due to, for example, the customer's communication channel interface (e.g. voice versus data channel), time-based analyses (e.g. the treatment was previously presented to the customer within a certain number of days, weeks, months prior to the present communication), membership parameters (e.g. the communication is from a member that is not entitled to certain benefits or exposure to is limited to certain services), or the like. Thereafter, relevant, unsuppressed treatment information, including scripts and related data is sent to the computing device of an appropriate organization agent, and the data is presented as a script in a GUI of the agent computing device.

The improved system architecture or technical framework provides a flexible, scalable technical framework (that includes a unique data layer, a specially configured treatment processor that personalizes the agent engagement with a user based on historical data and/or interactions, and a user interface layer that generates a selectively tailored GUI) and provides a customer with the same, albeit personalized, experience regardless of communication channel used. The technical framework allows the customer to use alternative channels, such as telephone communication or electronic communication (e.g., an email or website), and receive the same processing, treatments and agent engagement over the common platform or framework.

An improved CRM system embodiment is configured to generate treatment data personalized to the customer. The treatment data is converted into data scripts. In one example, the data scripts may be presented directly to the customer (e.g., via a tailored GUI of a website). In another example (i.e., when the customer contacts the organization telephonically), the data scripts are presented to the customer indirectly through an organization agent who receives the data scripts directly through a tailored GUI. In either example, while the data scripts may be slightly different due to the person receiving the scripts and the platform through which the scripts are being presented, the customer is presented with information dynamically tailored to the customer's relevant, contemporary needs.

BRIEF DESCRIPTION OF THE DRAWINGS

Embodiments of devices, systems, and methods are illustrated in the figures of the accompanying drawings, which are meant to be exemplary and non-limiting, in which like references are intended to refer to like or corresponding parts, and in which.

DETAILED DESCRIPTION

The detailed description of the present disclosure set forth herein makes reference to the accompanying drawings, which show various embodiments by way of illustration. While these various embodiments are described in sufficient detail to enable those skilled in the art to practice the disclosure, it should be understood that other embodiments may be realized and that logical and physical changes may be made without departing from the spirit and scope of the disclosure. Thus, the detailed description herein is presented for purposes of illustration only and not of limitation. For example, the steps recited in any of the method or process descriptions may be executed in an order other than as presented and are not limited to the order presented. Moreover, references to a singular embodiment may include plural embodiments, and references to more than one component may include a singular embodiment.

The present disclosure generally provides systems and methods for improved routing of calls and determining treatments to be presented to a customer of an organization. The present disclosure provides a customer relationship management (CRM) system in communication with an interactive voice response (IVR) system. The IVR system receives a customer communication and routes the customer to a competent organization agent at a networked terminal. The customer communication may be received via a typical telephone call, or may be received via other communication channels such as email, instant message, etc. The CRM and/or IVR systems are configured to communicate with internal and external sources to determine treatments for routing to the appropriate agent terminal along with pertinent data for presentment to the customer upon appropriate routing. For example, the customer's age, geographic location, and demographic information may be used to determine the customer's eligibility for one or more treatments, and such treatments and data may be provided at the agent terminal for delivery to "personalize" the interaction between the agent and customer.

In an illustrative embodiment the CRM system includes a treatment processor according to the disclosure including logic specific to the suppression of treatments. According to suppression logic in the treatment processor, even though a customer is eligible to receive a treatment, the treatment may be suppressed from being presented to the customer due to established or selected suppression criteria. That is, suppression logic may be "hardwired" within the treatment processor to apply the same logic each time suppression logic is applied, or the treatment logic may be selectively set or "programmed" within the treatment processor. Thereafter, relevant, unsuppressed treatment data is sent to the computing device of an organization agent, along with pertinent data packaged with the treatment(s) to be presented as script(s) in a GUI of the agent computing device on the network.

Figure 1A:
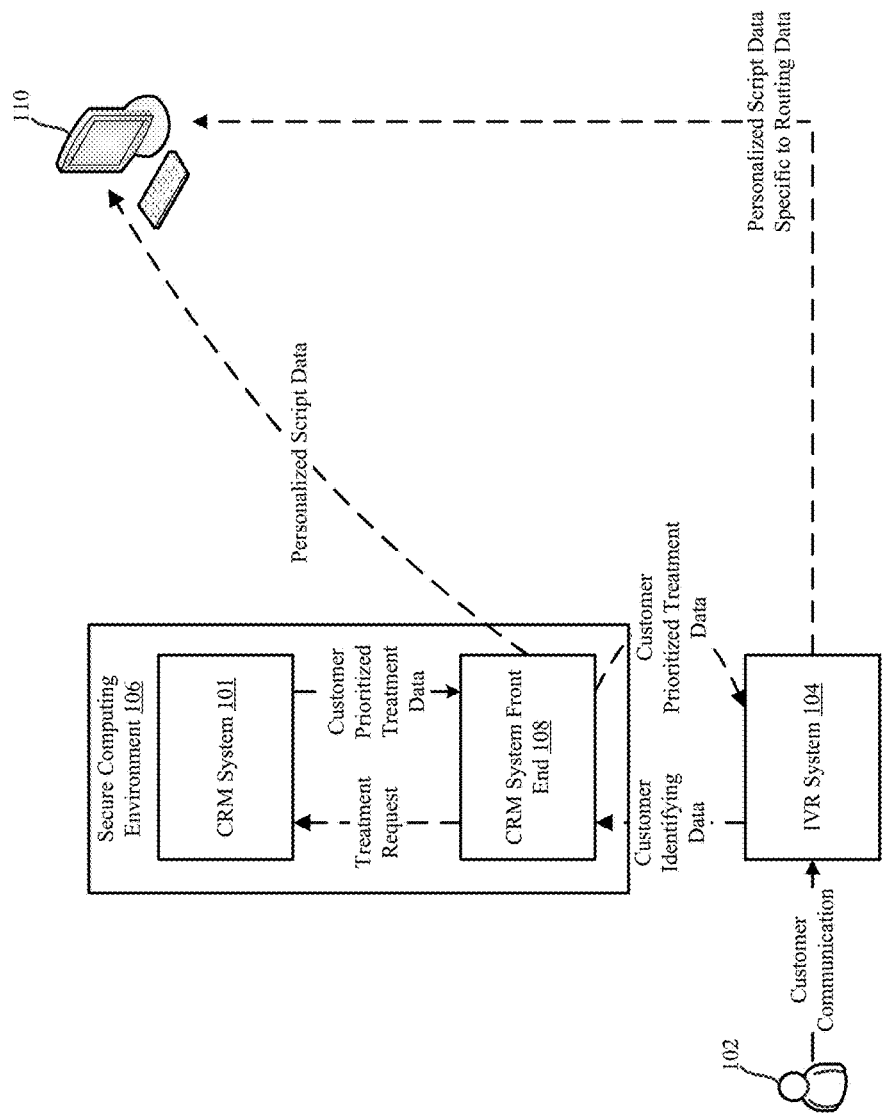
FIG. 1A illustrates a system overview of an improved routing system and methods for improved routing of incoming customer calls, data, and treatment options according to the disclosure.

FIG. 1A illustrates an overview system architecture for determining treatment options specific to an organization's customer for routing to an appropriate agent terminal. "Treatments" or "treatment options," as used herein, refer to tailored interactions that an organization representative may use when interacting with a particular customer and may include data routed specifically for that customer with the treatment or treatment options. The illustrative embodiment includes a customer relationship management (CRM) system 101 configured to manage an organization's interaction with current and future customers. The CRM system 101, such as a SEIBEL® Customer Relationship Management system available from Oracle Corporation of Redwood Shores, Calif., is in communication with an interactive voice response (IVR) system 104 configured to allowed the CRM system 101 to interact with a customer 102. For example, the IVR system 104 may be configured to receive voice data or dual-tone multi-frequency signals, input via a keypad, from a customer device. As illustrated, the IVR system 104 is separate from the CRM system 101. However, it should be appreciated that the IVR system 104 may be integrated within the CRM system 101, for example as a module.

The IVR system 104 receives a communication, for example via audio technologies such as a telephone, from the customer 102. The IVR system 104 gathers customer identifying information from the communication, transforms the information into corresponding customer identifying data, and transmits the data to a secure computing environment 106 of the CRM system 101. Within the secure computing environment 106, the customer 102 is authenticated using the received customer identifying data. A CRM system front end 108 generates and transmits a treatment request, specific to the customer 102, to the CRM system 101.

The improved CRM system 101 according to the disclosure works in conjunction with the CRM system front end 108 to determine treatment options for interaction with the customer 102 based on data within the treatment request. To determine treatment options, the CRM system front end 108 may communicate and obtain data from various data sources both internal and external to the CRM system 101. The CRM system 101 uses the treatment request to generate prioritized treatment data specific to the customer 102, and communicates the customer prioritized treatment data to the CRM system front end 108. The CRM system front end 108 may generate script data based on the customer prioritized treatment data, and thereafter transmit the customer personalized script data to an organization agent's computing device 110. The organization agent that operates the computing device 110 may be determined as an appropriate contact for the customer 102 using intelligent routing rules.

In an alternative embodiment, the CRM system front end 108 may transmit the customer prioritized treatment data to the IVR system 104. The IVR system 104 may thereafter generate script data (specific to the customer 102 and routing data) based on the customer prioritized treatment data, and transmit the customer personalized script data to the agent computing device 110.

In an alternative embodiment, the secure computing environment 106 may transmit the treatment data, and other relevant data, to the agent computing device 110. The secure computing environment 106 may use a treatment processor (described in greater detail hereinafter) to process the treatment data to generate a tailored graphical user interface (GUI) which is transmitted to the computing device 110 for specific use by the agent at the computing device 110 for interaction with the specific customer 102.

Figure 1B:
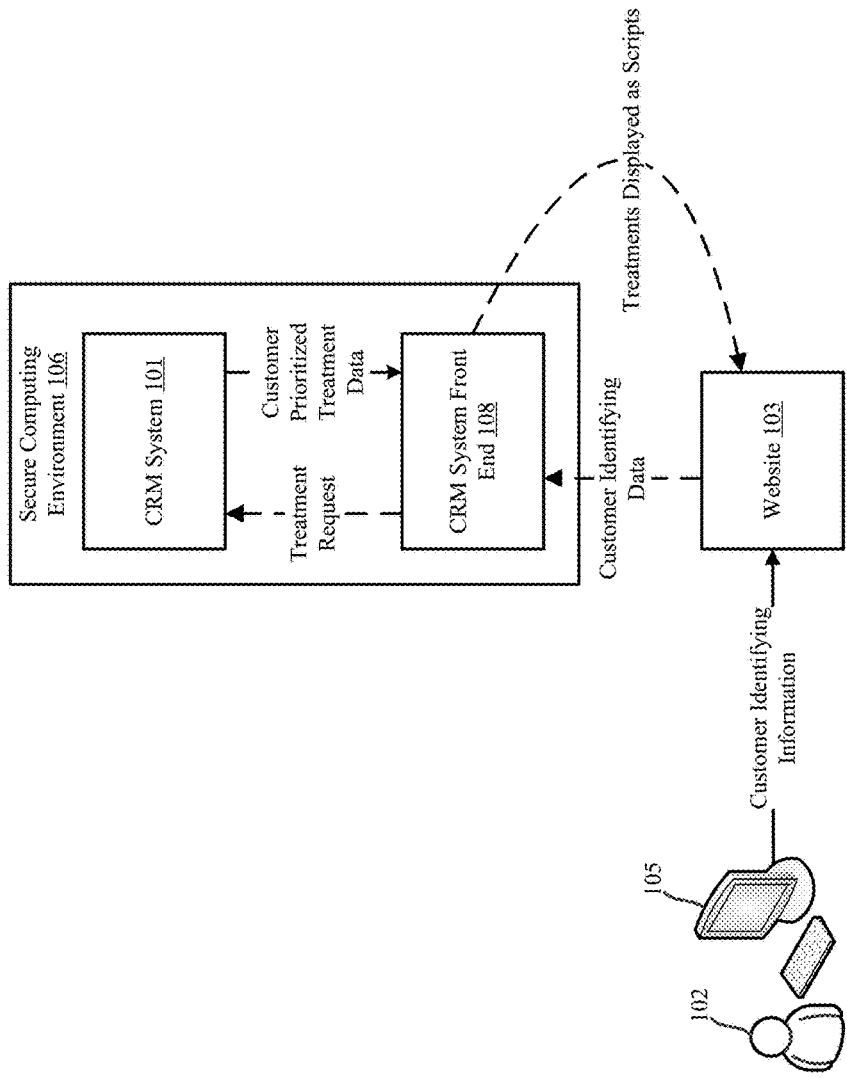
FIG. 1B illustrates a system overview of an improved routing system involving a web-based communication channel for improved routing of incoming customer communications, data, and treatment options according to the disclosure.

FIG. 1B demonstrates the flexibility and scalability of the technical framework of the present disclosure. While the system of FIG. 1B is a web based implementation, it should be appreciated that the user's experience according to the IVR-implemented system of FIG. 1A and the non-IVR-implemented system of FIG. 1B are nearly identical. Specifically, FIG. 1B provides a system architecture for determining treatment options for routing to a website, accessed by the customer using a computing device. The customer 102 uses a computing device 105 (e.g., a laptop computer, desktop computer, tablet, smart phone, etc.) to access a website 103 managed by the organization. As illustrated, the website 103 is maintained outside of the secure computing environment 106. However, one skilled in the art should appreciate that the website 103 may be maintained within the secure computing environment 106. The customer 102 inputs customer identifying information into a GUI of the website 103. The website 103 (i.e., a processor working in the background of the website 103) transforms the customer identifying information into corresponding customer identifying data, and sends the data to the CRM system front end 108.

Within the secure computing environment 106, the customer 102 is authenticated using the received customer identifying data. The CRM system front end 108 generates and transmits a treatment request, specific to the customer identifying data, to the CRM system 101. The CRM system 101 works in conjunction with the CRM system front end 108 to determine treatment options for interaction with the customer 102. The CRM system 101 uses the treatment request to generate prioritized treatment data specific to the customer 102, and communicates the customer prioritized treatment data to the CRM system front end 108. The CRM system front end 108 generates script data based on the customer prioritized treatment data, and thereafter transmits the customer personalized script data to the website 106. The website 106 then displays the personalized scripts to the customer 102 via a tailored GUI of the website, as described in detail hereinafter. In an example, the scripts presented via the tailored GUI of the website 103 may correlate to promotions and offers. One skilled in the art should appreciate that the personalized script data generated according to FIG. 1A and the personalized scripts generated according to FIG. 1B may be substantially similar in effect (i.e., may cause the customer 102 to have the same or a substantially similar experience whether the customer 102 engages the IVR system 104 or the website 103).

Figure 2:
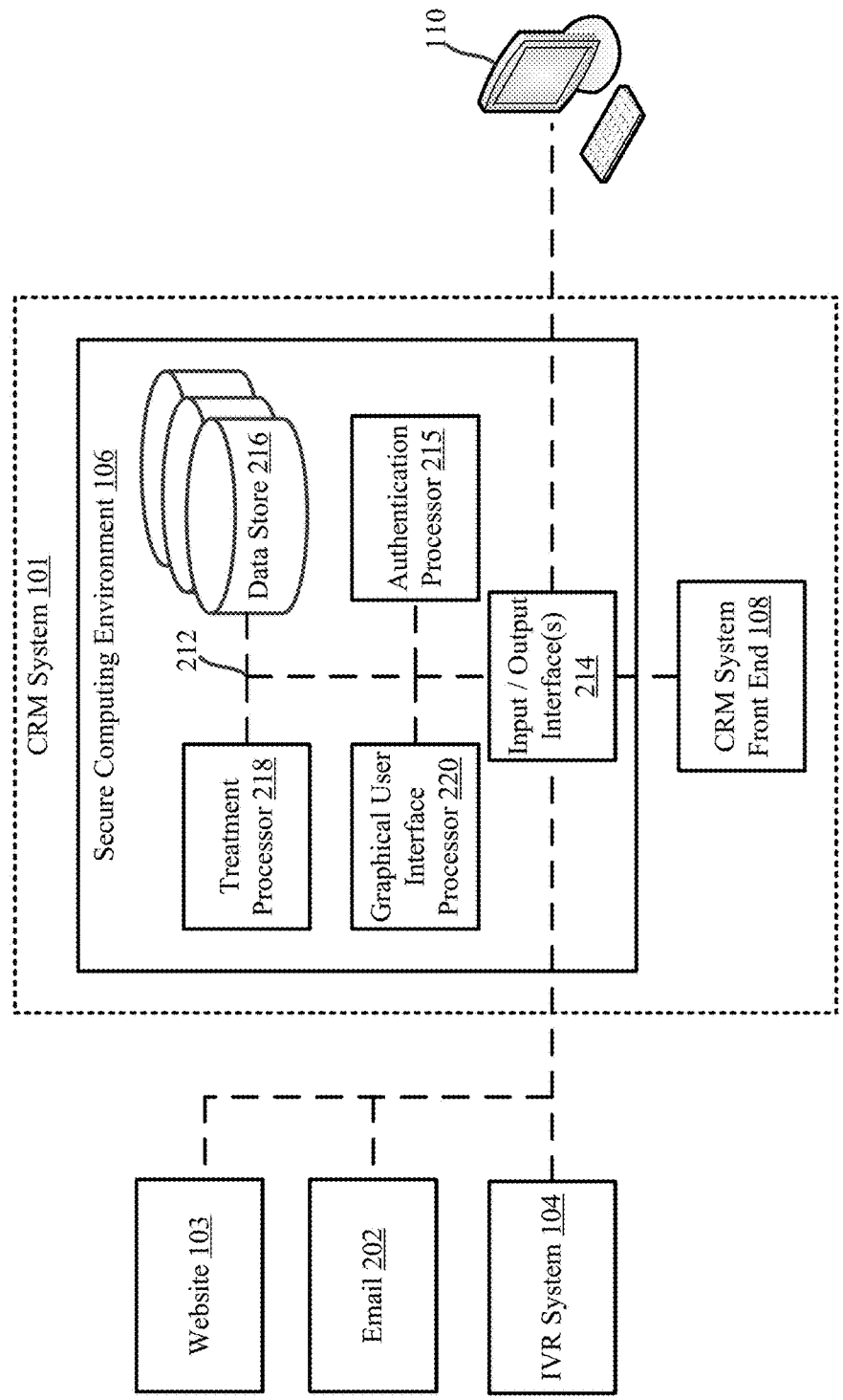
FIG. 2 illustrates, in further detail, the improved routing system of FIG. 1.

FIG. 2 illustrates, in further detail, the system of FIGS. 1A and 1B for determining treatment options specific to an organization's customer. The customer 102 may engage the CRM system 101 using various communication channels. For example, the customer 102 may communicate with the CRM system 101 via the the IVR system 104. The customer 102 may communicate telephonically with the IVR system 104 using various technologies. For example, the customer 102 may call the IVR system 104 using a telephone or a telephone feature of a smart device 210. Alternatively, the customer 102 may call the IVR system 104 using an application of a laptop computer, desktop computer, or a smart device. The customer 102 may also communicate with the CRM system 101 via the Internet. For example, the customer 102 may use the Internet on a laptop computer, desktop computer, smart device (such as a tablet or smart phone), or the like. Specifically, the customer 102 may communicate with the CRM system 101 over the Internet via email 202 or the website 103.

Customer information provided by the customer 102 is transformed into corresponding customer data. The customer data is transmitted to the secure computing environment 106 by the communication channel used by the customer 102 (i.e., the IVR system 104, email 202, or the website 103). Components of the secure computing environment 106 may be connected via one or more buss(es) 212 and/or direct linkages. The secure computing environment 106 includes at least one input/output interface 214 that enables the secure computing environment 106 to communicate data, control signals, data requests, and other information with other devices including computers, data sources, storage devices, and the like. The input/output interface(s) 214 may be configured to communicate via wired or wireless connections.

An authentication processor 215 of the secure computing environment 106 authenticates/validates the customer 102 using the received customer data. For example, the customer 102 may be validated by cross-referencing the received customer data with customer data previously stored within a data store 216 of the secure computing environment 106. The data store(s) 216 may be configured to allow data tables therein to be reworked without needing to create new scripts.

A treatment processor 218 within or otherwise connected to the secure computing environment 106 also generates a treatment request specific to the customer 102. The treatment request may be created before, during, or after authentication of the customer 102 occurs. The treatment processor 218 transmits the treatment request to the CRM system front end 108. The treatment request solicits pathways, i.e. routing, through which an organization representative/agent may interact with the customer 102. The CRM system front end 108 generates treatment data specific to interaction with the customer 102, and communicates the treatment data to the treatment processor 218, which manages storage of the treatment data within a data store 216.

The treatment processor 218 is configured to transform the data (including treatment data) housed within the data store(s) 216 into data usable within a tailored GUI. For example, rules/logic of the treatment processor 218 may enable the treatment processor 218 to determine customer treatment eligibility, treatment suppression, treatment prioritization using scoring methodologies, and control versus test group evaluations (for statistical evaluation of treatments) as described herein below. The data stored within the data store(s) 216 and manipulated by the treatment processor 218 includes, for example, predictive models, customer demographics data, transaction history data, and treatment data. Other non-described data may be stored within the data store(s) 216 and used by the treatment processor 218 depending upon implementation of the present disclosure.

A GUI processor 220 within or otherwise connected to the secure computing environment 106 is configured to use the data generated by the treatment processor 218 to create a tailored GUI usable during interaction with the customer 102. The GUI processor 220 is also configured to communicate the tailored GUI to the computing device 110 of the organization representative/agent to whom the customer 102 is routed. The GUI processor 220 may generate the tailored GUI according to the teachings of FIG. 13B described herein.

Figure 3:
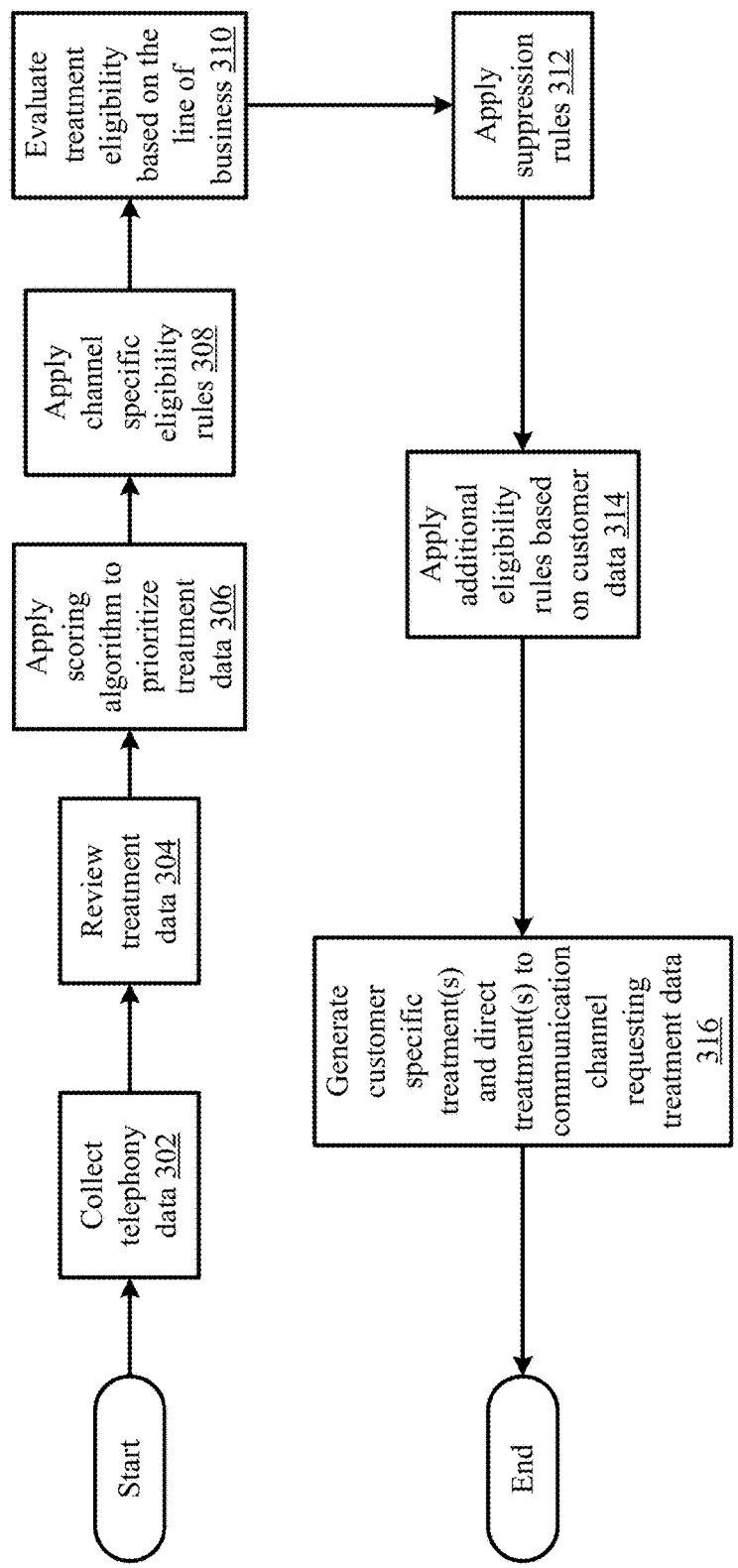
FIG. 3 illustrates a treatment processor processing treatment data to determine the eligibility of one or more treatments for transmission to an agent computing device.

FIG. 3 illustrates processing of treatment data by the treatment processor 218 to determine the eligibility of one or more treatments for transmission to the agent computing device 110. Data, for example, telephony data such as dialed toll free number (TFN), line of business, partner, caller time, call direction, etc., is collected by the treatment processor 218 (illustrated as 302). The treatment processor 218 also reviews the treatment data provided by the CRM system front end 108 (illustrated as 304). For example, the treatment processor 218 may determine the number of treatments (in the treatment data) to be further processed by the treatment processor 218 (illustrated as 304). The treatment processor 218 applies a scoring algorithm (described in detail herein below with respect to FIG. 4) to the treatment data to prioritize the treatment data (illustrated as 306). The treatment processor 218 also applies communication channel specific eligibility rules to the treatment data (illustrated as 308). The communication eligibility rules may determine the eligibility of one or more individual organization agents to interact with the customer 102. Additionally or alternatively, the communication eligibility rules may determine the eligibility of one or more organization control or test teams to interact with the customer 102.

Additionally, the treatment processor 218 evaluates eligibility of one or more treatments (detailed in the treatment data) based on line of business (illustrated as 310). For example, it may be determined, based on the treatment(s), whether the sales department, service department, or other department of the organization should interact with the customer 102. The treatment processor 218 also applies one or more suppression rules (described in detail herein below with respect to FIG. 5) to the treatment data (illustrated as 312).

Additional eligibility rules based on data specific to the customer 102 are also applied (illustrated as 314). Each eligibility criterion may have corresponding rules/logic that influence treatment presentment. For example, each eligibility criterion may influence treatment presentment on its own, or multiple eligibility criteria may need to be present for treatment presentment to be influenced. An illustrative and non-limiting list of eligibility criteria includes customer demographics, customer enrolled plans and products, customer payment data, customer recent call data, customer authentication data, customer communication channel type, customer activity/interest, customer personal data (e.g., age, gender, etc.), customer transactional data, and customer personal interests/hobbies.

The treatment processor 218, after performing one or more of steps 302 through 314, generates one or more eligible customer specific treatments and directs the treatment(s) to the communication channel requesting the eligible treatment data (illustrated as 316). For example, if the communication channel is a telephone channel, the treatment processor 218 directs the eligible treatment data to the agent computing device 110. According to a further example, if the communication channel is an IVR channel, the treatment processor 218 directs the eligible treatment data to the IVR system 104, which transmits the eligible treatment data to the agent computing device 110.

Figure 4:
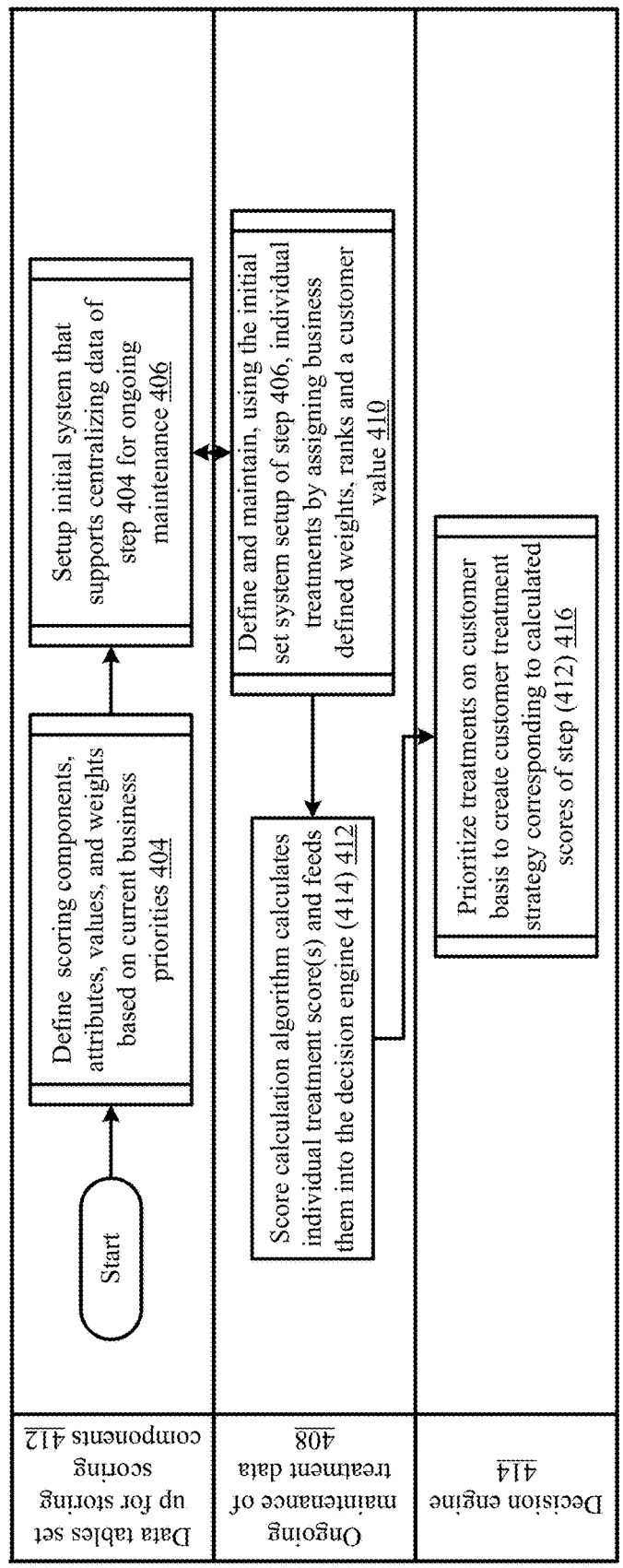
FIG. 4 illustrates scoring processing performed by the treatment processor on treatment data.

FIG. 4 illustrates scoring processing performed by the treatment processor 218 on the treatment data. Some or all of the processes described with respect to FIG. 4 may be performed at step 306 of FIG. 3 described above. The processing performed according to FIG. 4 provides flexibility to add/update scoring data anytime. This allows for dynamic adjustment of treatment prioritization to align treatment prioritization to organization priorities and objectives. The treatment processor 218 first sets up data tables within one or more of the data stores 216 to store scoring components (illustrated as 402). This involves defining scoring components, attributes, values, and weights based on current business priorities and objectives (illustrated as 404). An initial system that supports centralizing the data of step 404 for ongoing maintenance is also setup (illustrated as 406).

The treatment processor 218 also performs ongoing maintenance of treatment data (illustrated as 408). This includes, using the initial system setup of step 406, defining and maintaining each customer's treatment(s) by assigning business defined weights, ranks, and a customer value to each treatment (illustrated as 410). A score calculation algorithm of the treatment processor 218 calculates individual treatment scores using the output data of step 410, and feeds the calculated treatment scores into a decision engine 414 (illustrated as 412). The decision engine 414 prioritizes treatments on a customer basis to create an overall treatment strategy for each customer (illustrated as 416). Each customer's treatment strategy includes treatments prioritized/ordered according to the individualized treatment scores calculated for the customer at step 412.

Figure 5:
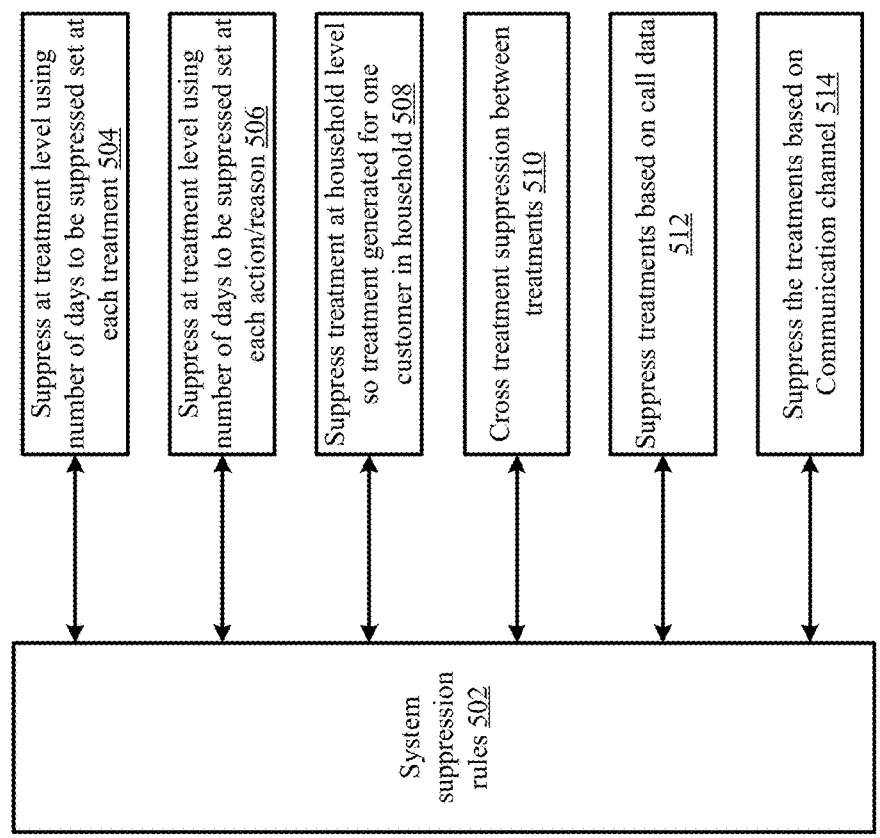
FIG. 5 illustrates suppression processing performed by the treatment processor on treatment data.

FIG. 5 illustrates suppression processing performed by the treatment processor 218 on the treatment data. Some or all of the processes described with respect to FIG. 5 may be performed at step 312 of FIG. 3 described above. The treatment processor 218 may include multiple system suppression rules/logic 502 specifically configured to perform the suppression of various treatment data as described herein. The suppression rules 502 may suppress data at a treatment level by setting a time period, e.g. number of days that each treatment should be suppressed (illustrated as 504). For example, a treatment may be suppressed for a number of days after each time the treatment is presented to the customer 102. Hence, the treatment would not be capable of being presented a subsequent time to the customer 102 until after the set number of days or other time period has transpired.

The suppression rules 502 may also suppress data at a treatment level by setting a time period or number of days that each treatment should be suppressed when specific actions/reasons are presented by the customer 102 (illustrated as 506). For example, a specific action/reason provided by the customer 102 may cause a treatment to be suppressed for a certain number of days, while another action/reason may cause the same treatment to be suppressed for a different number of days.

Additionally, the suppression rules 502 may suppress data at a household level so a specific treatment is only generated for one customer of a household (illustrated as 508). For example, suppression of a treatment to a specific customer of a household may be dictated by customer age, demographic, etc. According to this example, for instance, a treatment related to dementia, or some other condition/disease associated with the elderly population, may be suppressed to be presented to the oldest customer of a household or, alternatively, to a single customer of the household above a certain age.

The suppression rules 502 may perform cross treatment suppression (illustrated as 510). For example, if two identical treatments are identified as presentable to a single customer (or a single household), one of the treatments may be suppressed. This prevents presentment of duplicative, erroneous treatment data to an entity.

Treatments may also be suppressed on a customer level based on call data (illustrated as 512). For example, two treatments, each specific to a different health plan, may be identified as presentable to a customer 102. When the customer 102 contacts the organization (and ultimately the CRM system 101), the customer 102 may provide information or data that may be analyzed by the treatment processor 218. Analysis of the data may suggest the customer 102 is not interested in a particular health plan, and the treatment corresponding to that health plan may be suppressed.

Moreover, treatments may be suppressed based on communication channel (illustrated as 514). As described herein, a customer 102 may communicate with the CRM system 101 using various communication channels (e.g., telephone, email, text, website, instant messaging, etc.). Treatments may relate to specific communication channels, and may suggest the customer 102 use specific communication channels when communicating with the CRM system 101. Hence, if the customer 102 communicates with the CRM system 101 using a telephone, a treatment suggesting the customer 102 communicate with the CRM system 101 using a telephone in the future may be suppressed, due to its irrelevance.

Figure 6:
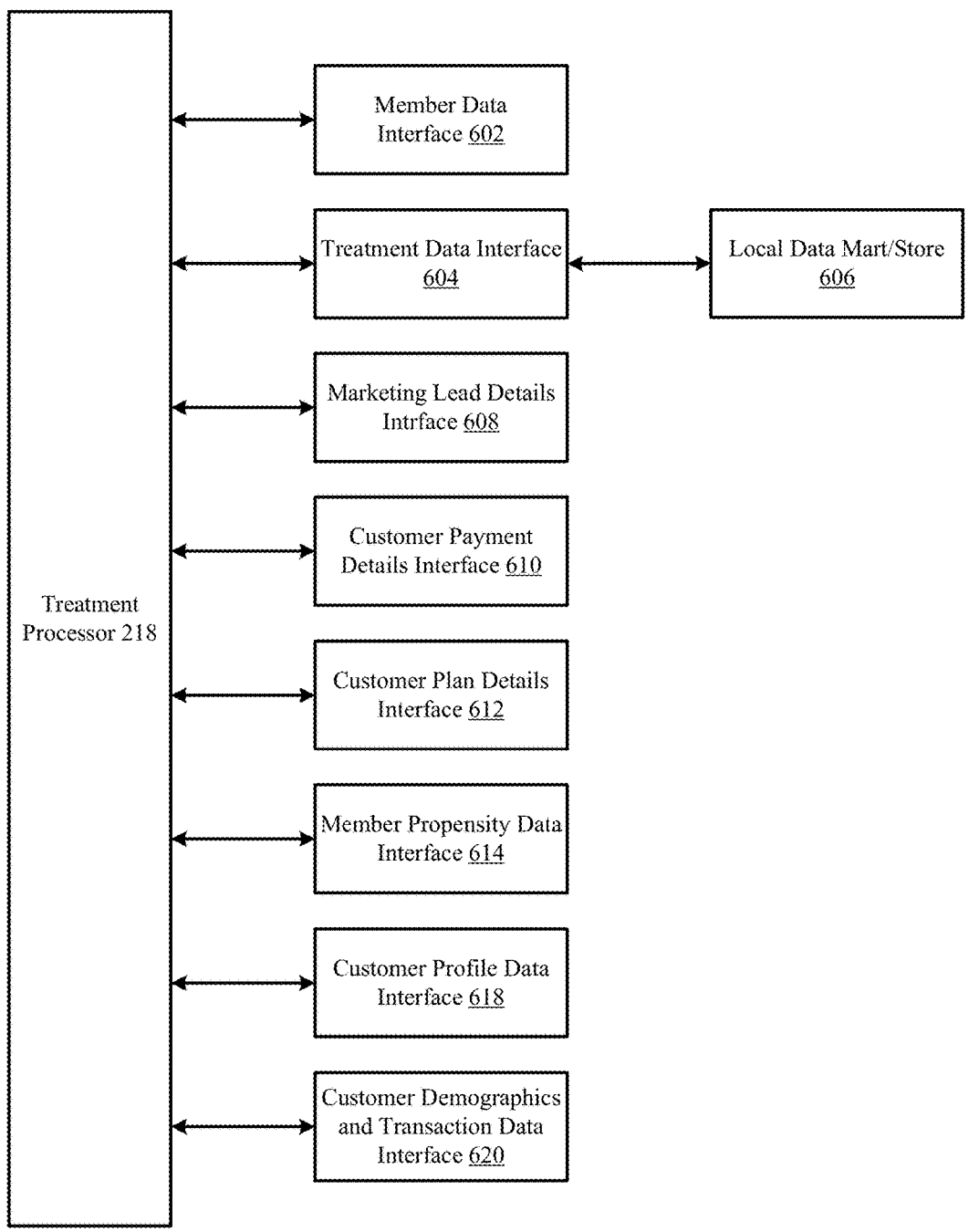
FIG. 6 illustrates treatment processor access of data both internal and external to an improved customer relationship management system.

FIG. 6 illustrates how the treatment processor 218 accesses data both internal and external to the CRM system 101. The treatment processor 218 is in communication with a member data interface 602, which allows the treatment processor 218 to validate the customer's organization membership status. The member data interface 602 may communicate with a computing system or data store external to the CRM system 101. The treatment processor 218 also communicates with a treatment data interface 604 (described in detail herein with respect to FIG. 7). The treatment data interface 604 obtains or receives treatment data from various sources such as, for example, internet registration, repeat caller info, initial payment details, and customer plan enrollment details. Thus, the treatment data interface 604 communicates with a data mart/store 606 of the CRM system 101. The local data mart/store 606 may be implemented as part of the data stores 216.

The treatment processor 218 is also in communication with a marketing lead details interface 608 that loads marketing leads in appropriate campaigns/treatments for personalization on a customer level. A customer payment details interface 610 also communicates with the treatment processor 218. In an example, the customer payment details interface 610 obtains payment details from a computing device or data store external to the CRM system 101. Payment details are beneficial for at least payment related treatments. As such, payment details may or may not be obtained if a payment related treatment is not present for a customer.

The treatment processor 218 further communicates with a customer plan details interface 612. The customer plan details interface 612 provides the treatment processor 218 with access to member/customer plan details. The customer plan details are beneficial for at least enrollment related treatments. Thus, a customer's plan details may or may not be accessed if an enrollment related treatment is not identified for the customer.

Additionally, the treatment processor 218 communicates with a member propensity data interface 614 that provides the treatment processor 218 with access to propensity model data. Propensity model data is at least beneficial for product specific treatments. A customer profile data interface 616 also communicates with the treatment processor 218. The customer profile data interface 618 may access the CRM system 101 and/or systems external to the CRM system 101 to provide the treatment processor 218 with access to member profile data. Member profile data is at least beneficial for service related treatments. Furthermore, the treatment processor 218 may communicate with a customer demographics and transaction data interface 620, which provides the treatment processor 218 with customer demographics and transactional data. In an example, the customer demographics and transactional data may be obtained from one or more data stores 216 of the CRM system 101. Customer demographics and transactional data may be beneficial for various treatments, including but not limited to the treatments specifically references with respect to FIG. 6.

Figure 7:
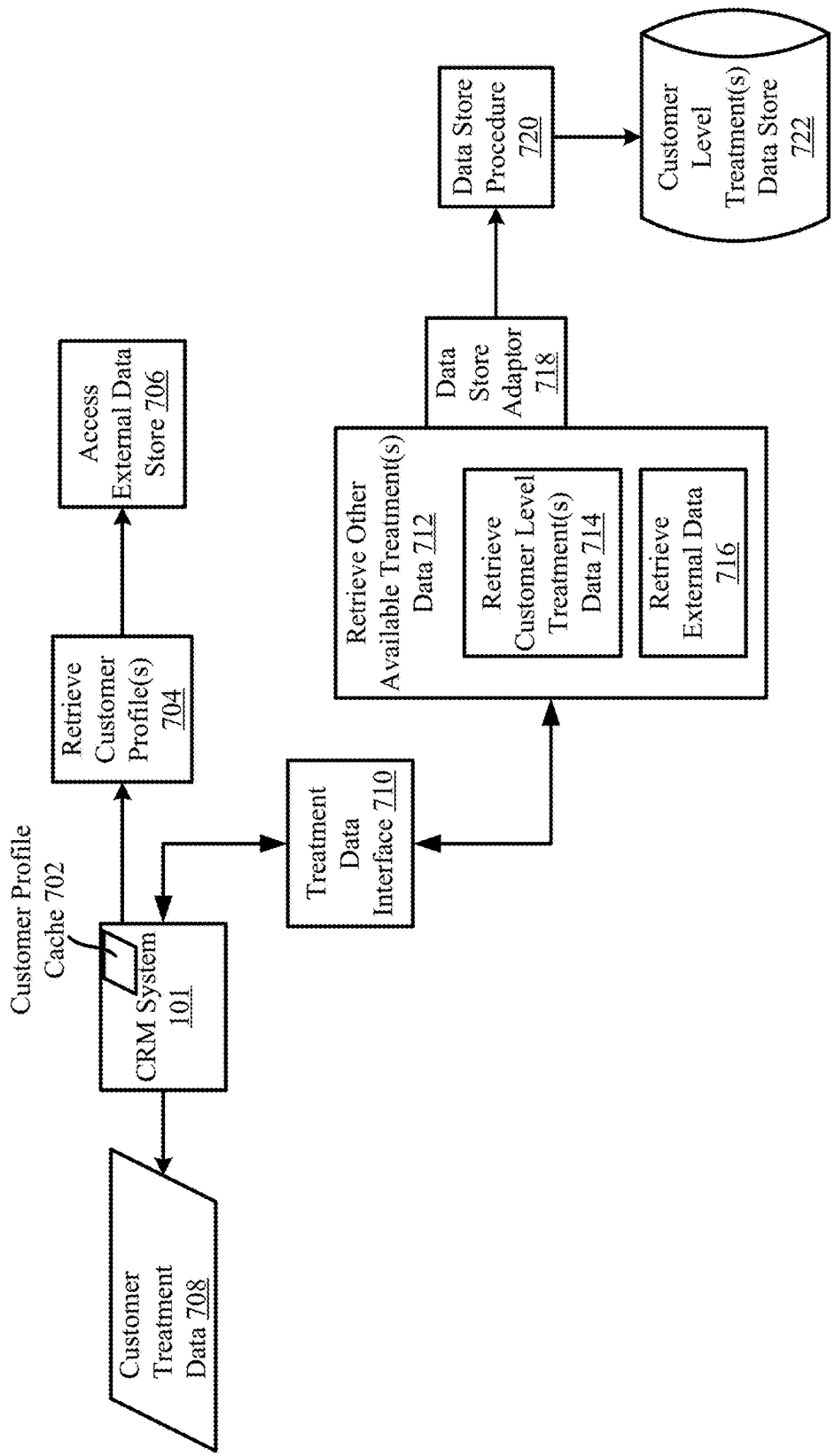
FIG. 7 illustrates a system process flow for retrieving treatment data.

FIG. 7 illustrates a system process flow for retrieving treatment data according to the present disclosure. The CRM system 101 contains a customer profile cache 702. This allows for future requests for the customer data to be retrieved faster than if the data was merely stored in a generic data store. The CRM system 101 uses the customer profile cache 702 to retrieve one or more customer profiles 704. This may involve accessing a data store external to the CRM system 101 (illustrated as 706). The CRM system 101 also accesses customer treatment data 708. Data within the customer profile cache 702 may be used to access the customer treatment data 708.

The CRM system 101 is in communication with a treatment data interface 710, which provides the CRM system 101 with access to other available treatment(s) data (illustrated as 712). The other available treatment(s) data may include data not already included within the customer treatment data 708. For example, the retrieval of other available treatment(s) data 712 may include retrieving one or more treatments data that is tailored on a customer level (illustrated as 714). This may include the use of a data store adaptor 718 and data store procedure 720. The data store adaptor 718 provides the treatment data interface 710 access to a customer level treatment(s) data store 722. The data store procedure 720 controls access to the customer level treatment(s) data store 722. For example, the data within the customer level treatment(s) data store 722 may be loaded into the data store 722 on a periodic basis, such as weekly, hourly, daily, and the like. Moreover, each treatment stored within the data store 722 may be associated with a single customer of the CRM system 101.

Additionally, the retrieval of other available treatment(s) data 712 may include obtaining data from one or more data stores external to the CRM system 101 (illustrated as 716). For example, external data may be pre-loaded into a treatment data store, which may be accessible through a single front end interface.

Figure 8:
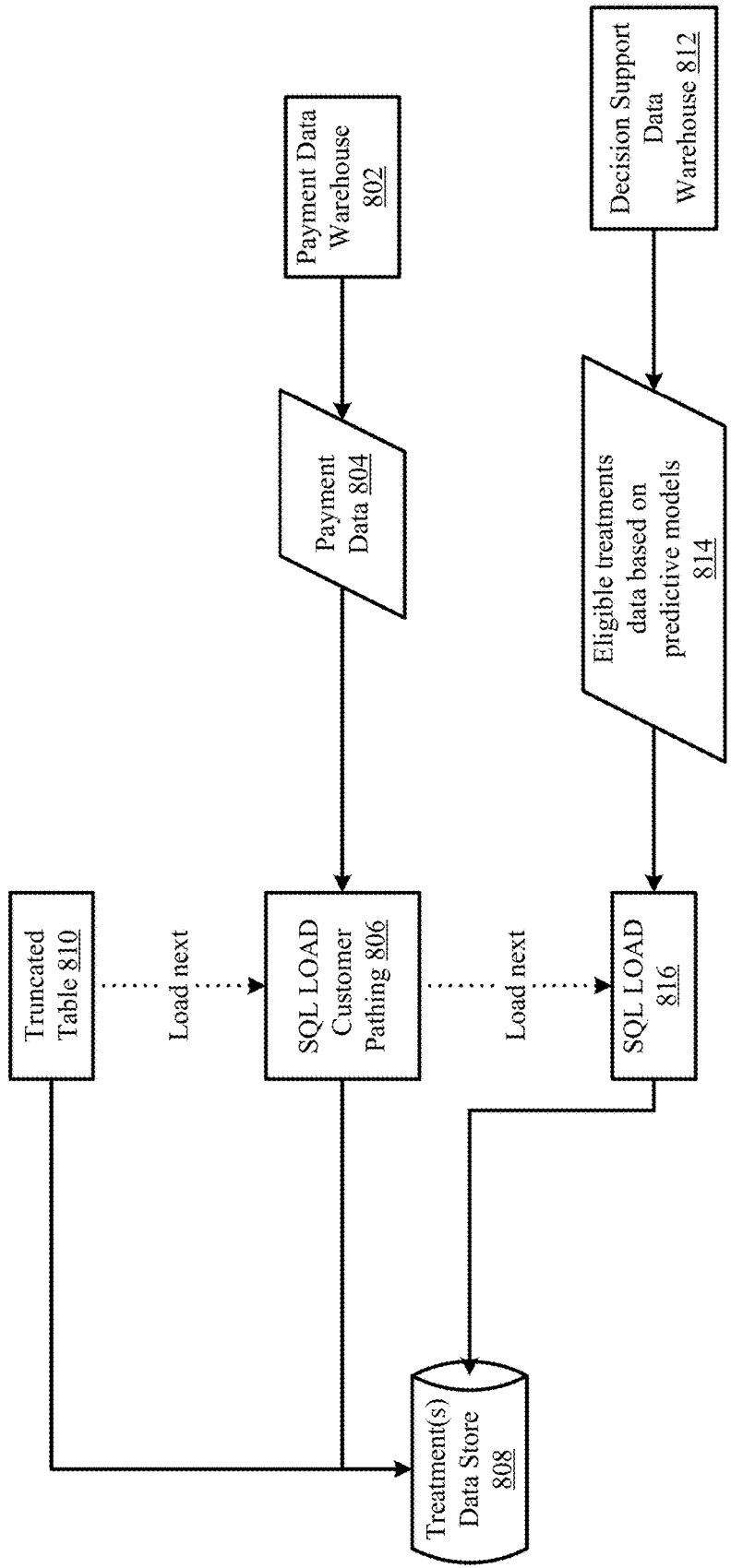
FIG. 8 illustrates a system process flow for loading treatment data into a data store.

FIG. 8 illustrates a system process flow for loading treatment data into a specially configured data store for use with the CRM system front end 108 and/or treatment processor 218. A payment data warehouse 802 includes payment data 804 that undergoes a structured query language (SQL) load function 806. The SQL load function 806 formats the payment data for customer pathing. Customer pathing affiliates payment data with its corresponding customer. The SQL loaded payment data is stored within a treatment(s) data store 808. Within the treatment(s) data store 808, payment data is stored in a manner that associates each portion of payment data with a corresponding customer, thereby allowing for easy retrieval of the payment data. Data may be loaded into the treatment(s) data store 808 on a periodic basis, such as a weekly basis, daily basis, hourly basis, and the like, for example.

A truncated data table 810 is also stored within the treatment(s) data store 808. The truncated table 810 includes data organized on a customer level. The truncated table 810 may be used in the SQL loading 806. Use of the truncated table 810 may play a role in the customer pathing of the payment data 804 as described above.

A decision support data warehouse 812 eligible stores treatments data 812 based on predictive models 814. The predictive models may be based on customer characteristics, demographics, transaction history, etc. The eligible treatments data 814 undergoes an SQL load function 816 and is thereafter stored within the treatment(s) data store 808. For example, the truncated table 810 may be used in the SQL loading 816 of the eligible treatments data 814. This allows for each eligible treatment of the eligible treatment data 814 to be pathed according to customer. As a result, customers detailed within the truncated table 810 are associated with treatments for which they are eligible.

Figure 9:
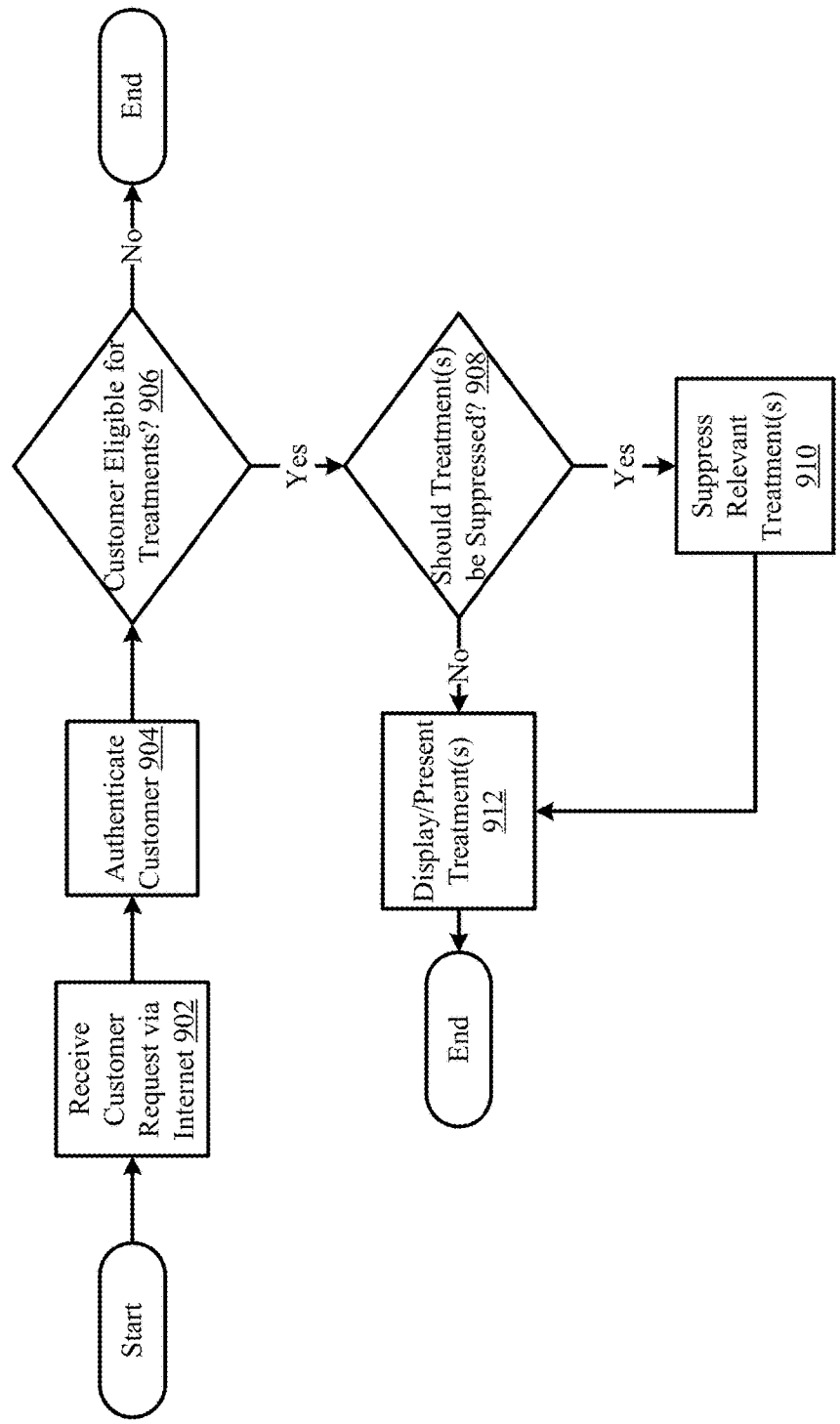
FIG. 9 is a process flow diagram illustrating a method for receiving a customer communication via an alternative communication channel (other than via a phone call/IVR) and routing to an organization representative with a tailored GUI containing treatments specific to the calling customer.

FIG. 9 illustrates a method for receiving a customer communication via an alternative communication channel (other than via a phone call/IVR) and providing an organization representative with a tailored GUI containing treatments specific to the communicating customer, as processed by the treatment processor 218 as described in detail hereinbefore. A communication is received thru the internet (e.g., an email or website communication) (illustrated as 902). The communication includes customer identifying information. The customer is then authenticated using the customer identifying information (illustrated as 904). Thereafter, it is determined whether the customer is eligible for one or more treatments (illustrated as 906). If the customer is not eligible for at least one treatment, processing of customer data ends and the customer is routed to an organization representative. However, if the customer is eligible for at least one treatment, it is then determined whether the eligible treatment(s) should be suppressed (illustrated as 908). If one or more treatments should be suppressed, the treatment(s) is/are suppressed (illustrated as 910). Alternatively, if no treatment(s) needs to be suppressed, or after step 910 is performed, the unsuppressed treatment(s) is sent from the treatment processor 218 to the agent computing device 110, where the unsuppressed treatment(s) is presented to the agent via a tailored GUI (illustrated as 912).

Figure 10:
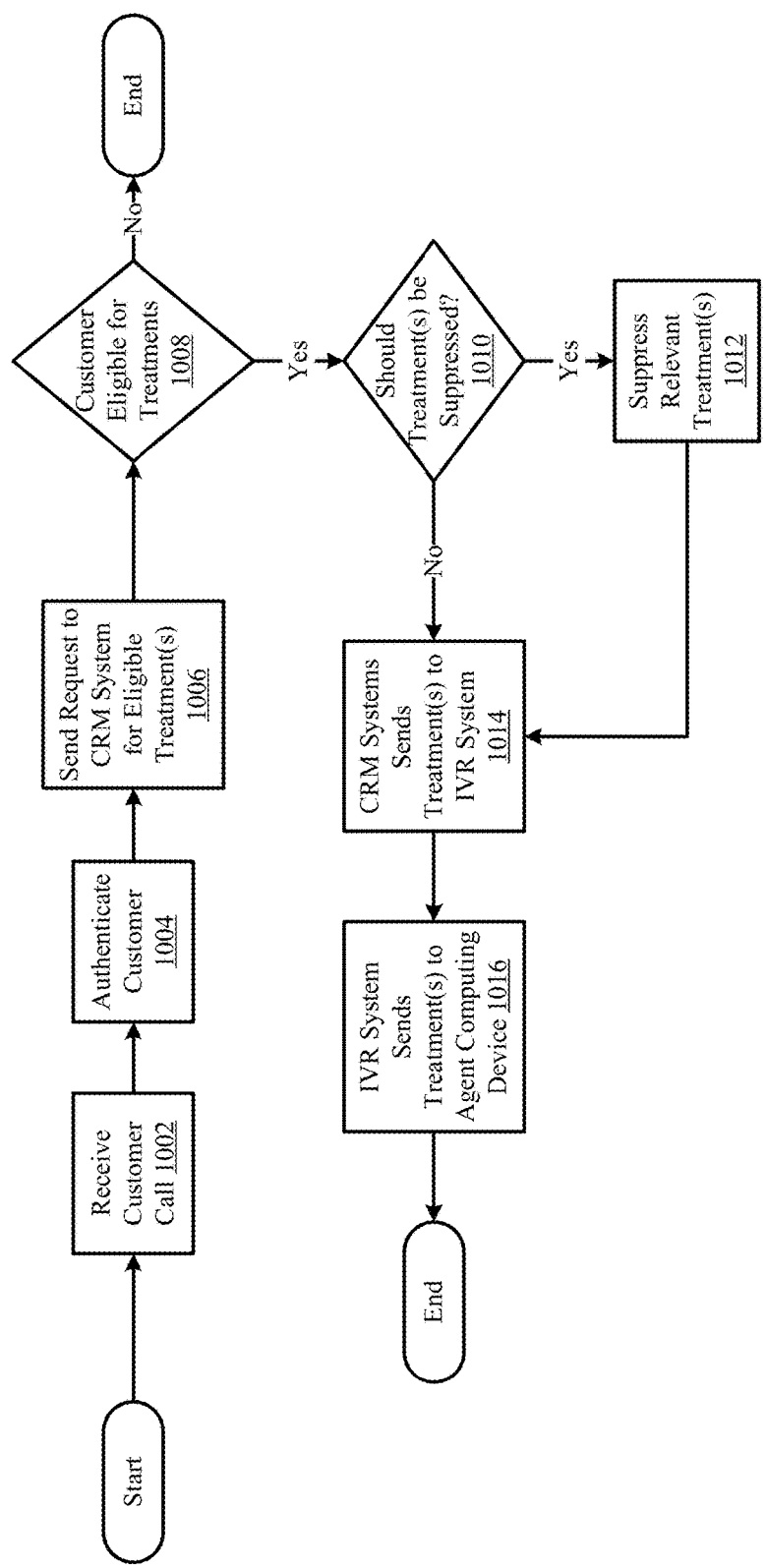
FIG. 10 is a process flow diagram illustrating a method for receiving a customer call via a phone through an improved IVR and routing to an organization representative with a tailored GUI containing treatments specific to the communicating customer.

FIG. 10 illustrates a method for receiving a customer call via a phone through the improved IVR system 104, and providing an organization representative with a tailored GUI containing treatments, as processed by the treatment processor 218 as described in detail hereinbefore, specific to the communicating customer. A customer call is received (illustrated as 1002) and the customer is authenticated (illustrated as 1004). Then, a request for customer eligible treatment(s) is sent to the CRM system 101 (illustrated as 1006), which in this embodiment would have an integrated treatment processor as described hereinbefore. The request of step 1006 may be sent by the IVR system 104. In response, the CRM system 101 determines the customer's eligibility for treatments (illustrated as 1008). If the customer does not meet the eligibility requirements for a single treatment, processing of customer and treatment data ends and the customer is routed to an organization representative. However, if the customer is eligible for at least one treatment, it is then determined whether the eligible treatment(s) should be suppressed (illustrated as 1010). If one or more treatments should be suppressed, the treatment(s) is/are suppressed (illustrated as 1012). Alternatively, if no treatment(s) needs to be suppressed, or after step 1012 is performed, the unsuppressed treatment(s) is sent from the CRM system 101 to the IVR system 104 (illustrated as 1014), and the IVR system sends the treatment data to the agent computing device 110 (illustrated as 1016).

Determinations made at steps 906 and 1008 may involve the use of predictive models that determine whether the customer would be interested in received one or more treatments. This may include applying the predictive models to various customer data such as, for example, age, location, whether the customer is insured, etc.

For example, predictive modeling may be used to determine the propensity of a customer to use a web-based communication channel for further needs. According to this example, the predictive model may analyze demographic information, historical engagement information, interests and hobbies information, and computer usage information. Demographic information that may be analyzed includes age, gender, where the customer lives, birth date, life stage segment (i.e., a combination of age, lifestyle, where the customer lives, is the customer an empty nester, etc.), etc. Historical engagement information that may be analyzed includes the customer's renewal history (i.e., how many times the customer renewed their membership), how long the customer has been a member of the organization, whether the customer is still an active member, the date the customer first became a member of the organization, what communication channel(s) the customer used to renew their membership, what type of and how frequently the customer has received marketing from the organization, whether the customer has responded to received marketing, etc. Interest and hobby information that may be analyzed includes the customer's concern regarding children (e.g., does the customer have/want children), whether the customer typically goes online, whether the customer receives long-term care, whether the customer is employed, what type of employment the customer has, etc. Computer usage information that may be analyzed includes whether the customer has made online orders/purchases, whether the customer is a broadband user, whether the customer owns a personal computer, etc. The output of the predictive model may be a score that indicates a propensity for the customer to use a web-based communication channel in the future. Moreover, the score may be used to determine treatments, used by an agent, to guide the customer to use a web-based communication channel.

It may be desirable to transform information prior to analyzing the information using the predictive model. For example, if the information, when received, has values that resemble a normal distribution that satisfies certain assumptions inherent in the modeling technique used, the information need not be transformed. In contrast, if the information has values that are not conducive to being used in the model, the information may be transformed/altered to impose a more normal distribution on the values, thereby making the values more useful for the model. For example, information may be transformed using numerous functions such as logarithm, square root, and reciprocal transformation, as known in the art or statistical analysis.

Determinations made at steps 908 and 1010 may involve ratings/score prioritization. For example, each component of a treatment may include a code, and each code may have a corresponding score/rating. Each treatment may have a score equal to the sum of its components' scores. Then, the treatments may be prioritized based on their scores, and suppression may be determined therefrom. Additionally, suppression may be determined as described with reference to FIG. 5.

It should be appreciated that the teachings of the present disclosure, and specifically FIGS. 9 and 10, provide scalability to various communication channels. Thus, the systems and methods of the present disclosure are channel independent, thereby providing for data and treatment flexibility.

Figure 11:
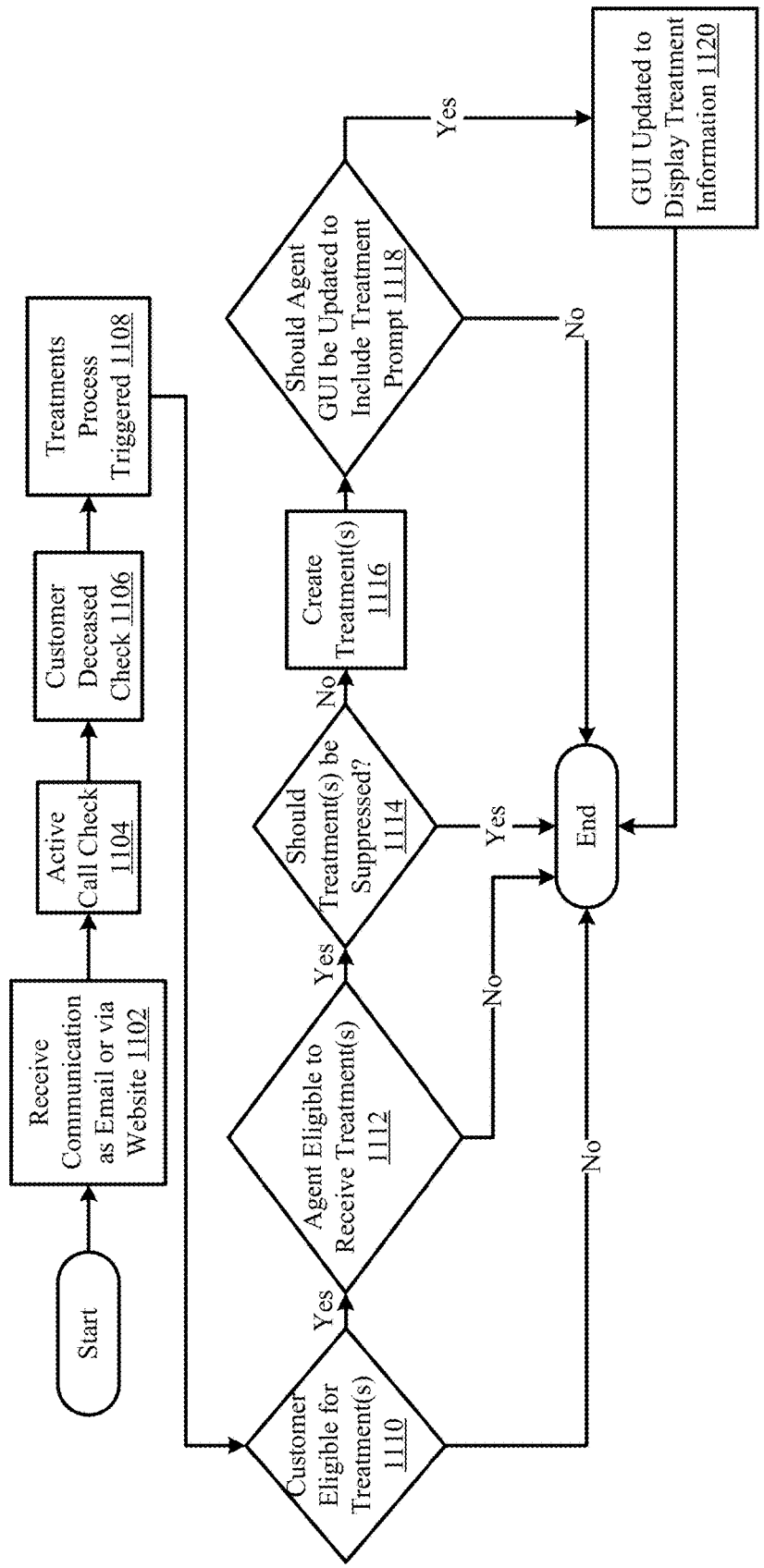
FIG. 11 is a process flow diagram illustrating a method for receiving a customer communication via an alternative communication channel (other than via a phone call/IVR) and providing a GUI, specific to a customer, to an organization agent.

FIG. 11 illustrates a method for receiving a customer communication via an alternative communication channel (other than via a phone call/IVR) and providing a GUI, specific to a customer, to an organization agent. In this illustrative embodiment, a communication is received as an email 202 or via the website 103 (illustrated as 1102). Thereafter, an active call check is performed by the CRM system 101 (illustrated as 1104), and the CRM system 101 performs a customer deceased check (illustrated as 1106). The customer deceased check determines if the communication relates a deceased individual.

Then, the treatments processor 218, in this illustrative embodiment implemented in the CRM system 101, is triggered (illustrated as 1108). It is determined whether the customer is eligible for at least one treatment (illustrated as 1110). If the customer is not eligible for at least one treatment, processing of customer data is ended, and the customer and customer data are routed to an organization agent and the agent's computing device respectively. If the customer is eligible for one or more treatments, it is determined whether the agent is eligible to receive the treatment (s), i.e., whether the agent is qualified to consult with the customer regarding the treatment(s) (illustrated as 1112). If the agent is not eligible, processing of treatment data and customer data is ended, and the agent's GUI (which is tailored to the customer) is not updated. If, instead, it is determined that the agent is eligible to receive the treatment (s), the CRM system 101 determines whether the treatment (s) should be suppressed (illustrated as 1114). If it is determined that all of the treatments should be suppressed, processing of treatment data and customer data is ended, and the agent's GUI is not updated (causing the agent to conduct communication with the customer as if no treatments for the customer exist). If, however, it is determined that at least one treatment should not be suppressed, the unsuppressed treatments are created for the customer by the treatment processor in the CRM system 101 (illustrated as 1116).

The CRM system 101 also determines whether the agent's GUI should be updated to include a prompt for the unsuppressed treatment(s) (illustrated as 1118). If the GUI should not be updated, the GUI remains as is (resulting in the agent conducting communication with the customer as if no treatments for the customer exist). If, instead, it is determined that the GUI should be updated, the CRM system 101 updates the GUI to include treatment information (illustrated as 1120).

Figure 12:
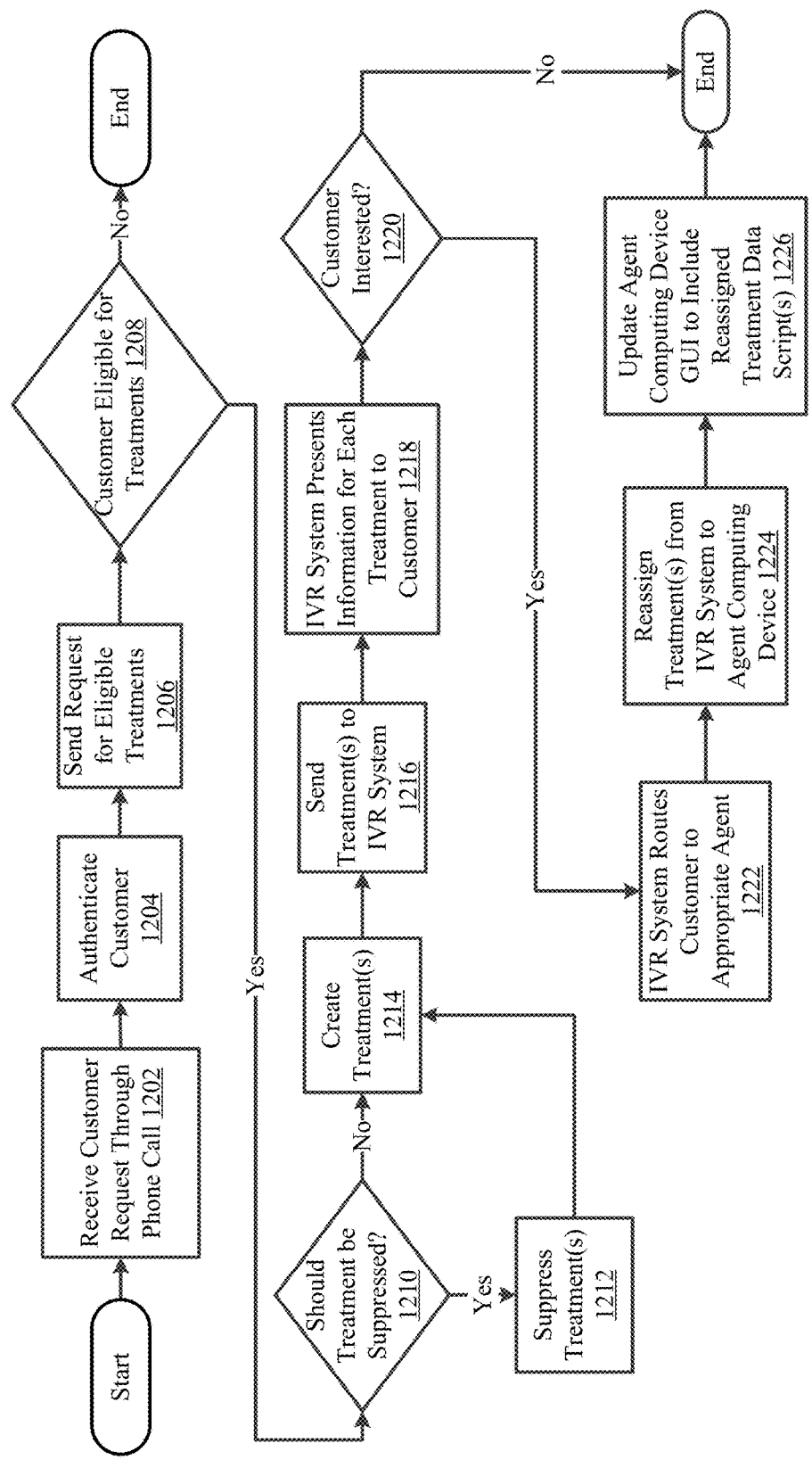
FIG. 12 is a process flow diagram illustrating a method for receiving a customer call, routing the customer call, and providing an organization agent with a GUI tailored to the customer.

FIG. 12 illustrates a method for routing a customer call and providing an organization agent with a GUI tailored to the customer. A customer request is received through a phone call (illustrated as 1202) and the customer is authenticated using information contained in the request (illustrated as 1204). The CRM system 101, in this embodiment configured with a treatment processor as described hereinbefore), then sends a request for eligible treatments (illustrated as 1206) and it is determined whether the customer is eligible for one or more treatments (illustrated as 1208). If the customer is not eligible for treatments, the method ends. If, instead, it is determined that the customer is eligible for at least one treatment, it is then determined whether the customer's eligible treatment(s) should be suppressed (illustrated as 1210). If any treatment should be suppressed, the treatment is suppressed (illustrated as 1212). If no treatments should be suppressed, or after step 1212 is performed, the CRM system 101 creates the unsuppressed treatment(s) (illustrated as 1214).

The created treatment(s) is sent to the IVR system 104 (illustrated as 1216) and the IVR system 104 presents information corresponding to each treatment to the customer (illustrated as 1218). The IVR system 104 then determines whether the customer is interested in one or more of the treatments (e.g., by analyzing interactive voice responses of the customer 102) (illustrated as 1220). If the customer is not interested, the method ends. If, however, the customer is interested, the IVR system 104 routes the customer to an agent competent to consult the customer regarding the treatment(s) the customer is interested in (illustrated as 1222). The CRM system 101 then reassigns the treatment(s) from the IVR system 104 to the computing device of the agent to whom the customer was routed (illustrated as 1224). When the treatment(s) is reassigned, a GUI displayed on the agent computing device (tailored to the customer 102) is updated to include scripts corresponding to the reassigned treatment data (illustrated as 1226).

Figure 13A:
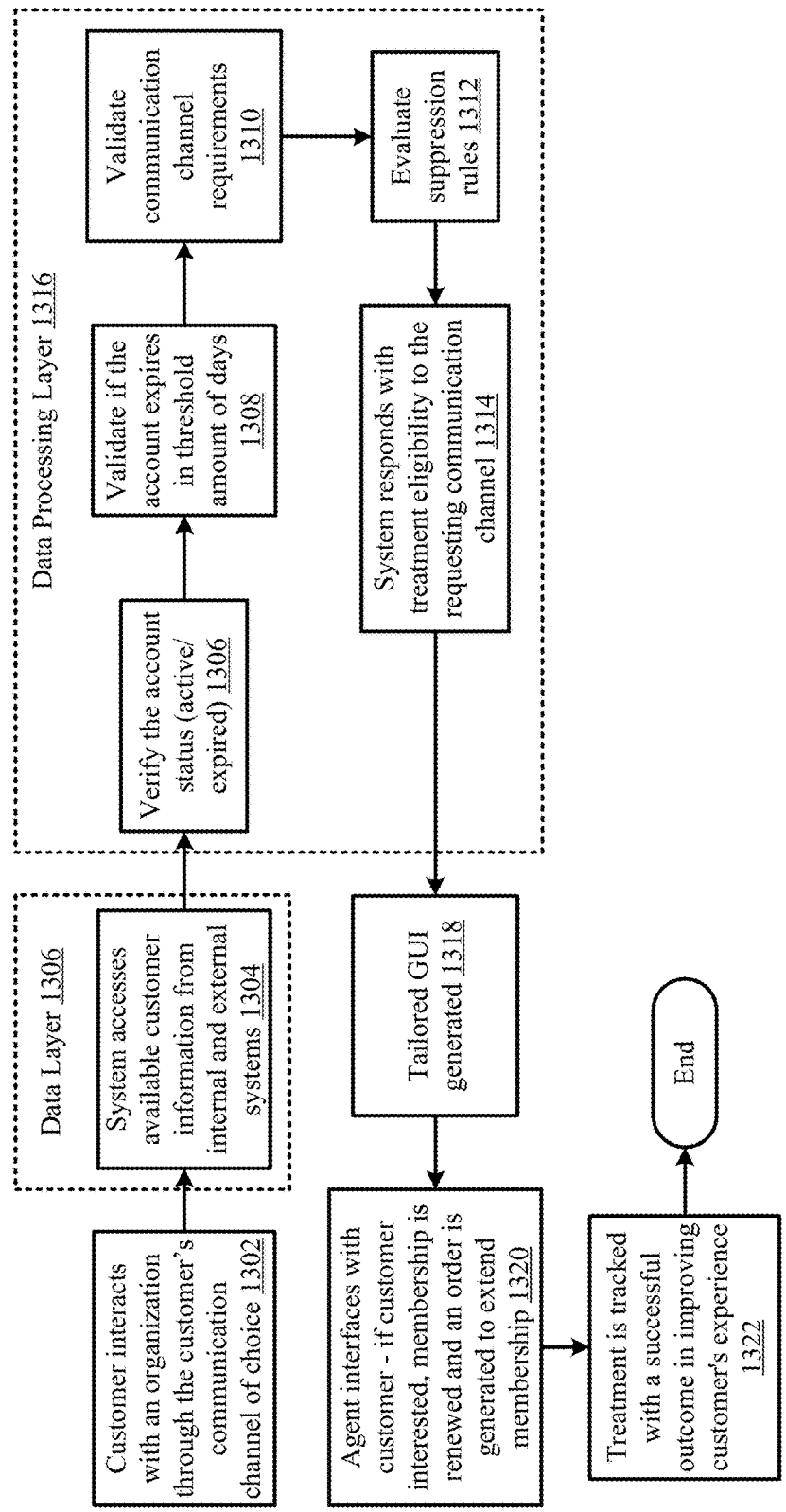
FIG. 13A is a process flow diagram illustrating a method for accessing a unique data layer, processing customer information, and generating a tailored GUI according to the present disclosure.

FIG. 13A shows an illustrative method for accessing a unique data layer of the architecture, processing customer information, and generating a tailored GUI according to the present disclosure, in an example that relates to membership renewal. To start, the customer interacts with an organization through the customer's communication channel of choice (illustrated as 1302). For example, the customer may interact with the organization using IVR, a website, etc. In response, the system accesses available customer information from internal and external systems (illustrated as 1304). The accessible internal and external systems may be referred to as the unique data layer 1306 of the present disclosure and may comprise a number of databases with information relevant and/or related to the customer.

Based on the accessed customer information, a status of the customer's account (e.g., active or expired) is verified (illustrated as 1306), it is validated whether the customer's account expires in a threshold amount of days (e.g., 180 days) (illustrated as 1308), and channel requirements of the communication channel used by the customer are validated (illustrated as 1310). For example, a "repeat caller" treatment may be generated when the validated communication channel is a phone channel (i.e., when the customer contacts the organization via a phone channel). However, it should be appreciated that a "repeat caller" treatment may be generated for various communication channels that are associated with repeat call data. In another example, since membership renewal is relevant to all communication channels, a "membership renewal" treatment is activated regardless of the validated communication channel. Accordingly, one skilled in the art should appreciate that treatments may or may not be generated based on their relevance to the validated communication channel. Additionally, suppression rules are evaluated (illustrated as 1312) and the system responds with treatment eligibility to the requesting communication channel (illustrated as 1314). Steps 1306-1314 may be referred to as the specially configured data processing layer 1316 of the present disclosure.

The treatment eligibility data is used to generate a tailored GUI (illustrated as 1318 and described in detail with respect to FIG. 13B below). An organization agent interfaces with the customer using the tailored GUI and, if the customer is interested, the customer's membership is renewed and an order is generated to extend the customer's membership (illustrated as 1320). Then the treatment regarding membership renewal is tracked as obtaining a successful outcome in improving the customer's experience (illustrated as 1322).

Figure 13B:
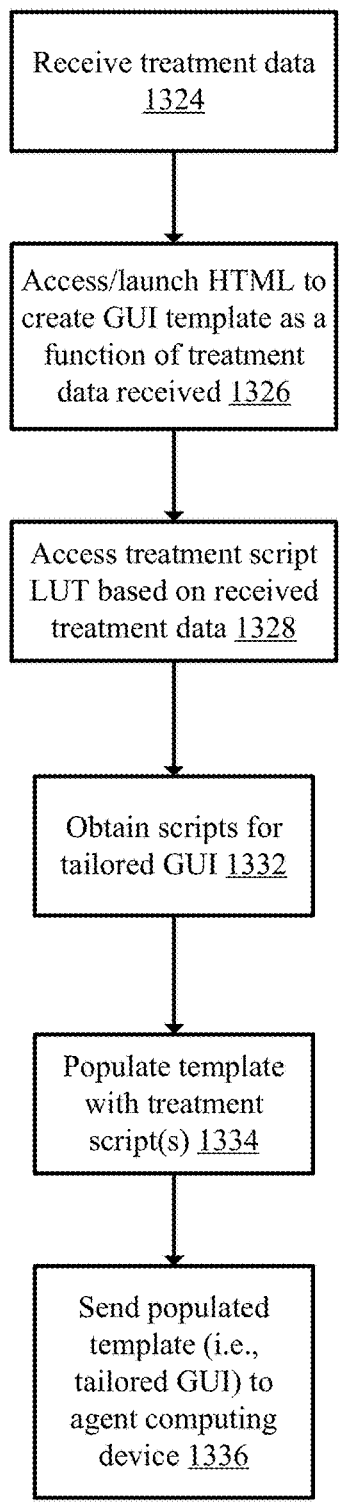
FIG. 13B is a process flow diagram illustrating a method for generating a tailored GUI according to the present disclosure.

FIG. 13B illustrates a method for generating a tailored GUI according to the present disclosure. For example, the GUI processor 220 may receive treatment data (e.g., treatment eligibility data) (illustrated as 1324) and access/launch HyperText Markup Language (HTML) to create a GUI template (illustrated as 1326). The GUI processor 220 may also access a treatment script LUT based on the received treatment data (illustrated as 1328) and obtain scripts corresponding to the treatment data (illustrated as 1332). Once one or more scripts are obtained, the GUI template is populated with the selected script(s) (illustrated as 1334). Thereafter, the populated template (i.e., tailored GUI) is sent to an appropriate agent computing device (illustrated as 1336).

Various applications of the disclosed techniques provide substantial improvements to the functioning of the computer apparatus and the technical environments in which the various applications are implemented. Moreover, although the present disclosure has been described herein with reference to the accompanying drawings, it is to be understood that the present disclosure is not limited to those precise teachings, and that various other changes and modifications may be made by one skilled in the art without departing from the spirit and scope of the present disclosure.

What is claimed is:

1. An improved customer relationship management (CRM) device for providing an agent workstation with an updated GUI containing treatment data scripts specific to an individual, comprising:
    a graphical user interface (GUI);
    a treatment processor electrically interconnected to the GUI, the treatment processor receiving treatment data associated with an individual, the treatment data including treatment information, the treatment processor generating score information for each treatment indicated within the treatment information, the treatment processor also determining whether any of the treatment information should be suppressed, the treatment processor communicating unsuppressed treatment information to the GUI in the form of data scripts, the treatment processor also causing the GUI to update to include the data scripts in response to an active treatment icon of the GUI being interacted with; and
    wherein the treatment processor suppresses treatment information based on reasons provided by the individual, each of the reasons causing corresponding treatment information to be suppressed for a unique amount of time.

2. The device of claim 1, wherein the treatment processor further:
    suppresses treatment information corresponding to household level information of the individual; and
    suppresses treatment information based on the communication channel data.

3. The device of claim 1, wherein the treatment processor generates a treatment strategy specific to the individual, the treatment strategy being based on a prioritization of the score information.

4. The device of claim 3, wherein the score information is generated by assigning a weight, a rank, and a value specific to the individual to each of the treatments of the treatment data.

5. The device of claim 1, wherein the treatment processor is in communication with an interactive voice response (IVR) system, and wherein the treatment processor suppresses IVR treatment information.

6. The device of claim 1, wherein each treatment of the treatment information is suppressed by the treatment processor for an amount of time after presentment to the individual, the suppression amount of time being unique to each treatment.

7. The device of claim 1, further comprising a profile cache electrically interconnected to the treatment processor, the profile cache enabling the treatment processor to access data scripts previously communicated to the GUI.

8. A method for updating a graphical user interface (GUI) with treatment data scripts specific to an individual, comprising:
    receiving communication data specific to an individual, the communication data including demographic information and communication channel information;
    receiving treatment data specific to the individual, the treatment data including treatment information;
    generating score data for treatments of the treatment information using weights, ranks, and a value specific to the individual;
    determining whether any of the treatment information should be suppressed from communication to the GUI based at least in part on the score data;
    communicating unsuppressed treatment information to the GUI;
    causing the GUI to update to include data scripts, corresponding to the unsuppressed treatment information, in response to an active treatment icon of the GUI being interacted with; and
    wherein the treatment processor suppresses treatment information based on reasons provided by the individual, each of the reasons causing corresponding treatment information to be suppressed for a unique amount of time.

9. The method of claim 8, further comprising applying predictive models to the treatment information, the predictive models using information specific to the individual to determine a likelihood that the individual is interested in each treatment of the treatment information.

10. The method of claim 8, further comprising determining treatment eligibility based on communication channel used by the individual.

11. The method of claim 10, further comprising determining the individual used an interactive voice response (IVR) system, and suppressing treatment information corresponding to the IVR system.

12. An improved communication channel system, comprising:
- a communication channel system that receives communication data from an individual;
- a customer relationship management (CRM) system in communication with the communication channel system, the CRM system receiving the communication data from the communication channel system;
- a treatment processor electrically interconnected to the CRM system, the treatment processor receiving treatment data, the treatment data including data scripts associated with treatments specific to the individual, the treatment processor also determining whether any of the data scripts should be suppressed, the treatment processor causing the CRM system to communicate unsuppressed data scripts to an agent workstation; and wherein the treatment processor suppresses data scripts based on reasons provided by the individual, each of the reasons corresponding to a unique number of days that a corresponding data script is suppressed.

13. The system of claim 12, wherein the communication channel system receives communication data from a plurality of communication channels, and wherein the treatment processor suppresses data scripts based on a communication channel using by the individual.

14. The system of claim 12, further comprising a profile cache electrically interconnected to the CRM system, the treatment processor using the profile cache to access data scripts that are specific to the individual and that were previously presented to the agent workstation.

15. The system of claim 14, wherein the treatment processor suppresses data scripts that have been used by the agent workstation within a threshold amount of time.

16. The system of claim 12, wherein the treatment processor suppresses data scripts that have been presented to the agent workstation within a threshold number of days, each treatment corresponding to a unique number of days for corresponding data scripts to be suppressed.

17. The system of claim 12, wherein the treatments of the treatment data are based on predictive models and payment data associated with the individual.

18. The system of claim 12, wherein data scripts, communicated to the agent workstation, are updated on a graphical user interface (GUI) of the agent workstation in response to active treatment icon of the GUI being interacted with.

\* \* \* \* \*